W. BARRY.
MAIL MARKING MACHINE.
APPLICATION FILED MAY 14, 1909.

940,496.

Patented Nov. 16, 1909.
11 SHEETS—SHEET 1.

Witnesses
E. R. Peck
C. P. Wright, Jr.

Inventor
William Barry
By Hubert E. Peck
Attorney

W. BARRY.
MAIL MARKING MACHINE.
APPLICATION FILED MAY 14, 1909.

940,496.

Patented Nov. 16, 1909.
11 SHEETS—SHEET 3.

Witnesses
E. R. Peck
C. P. Wright Jr.

Inventor
William Barry
By Hubert E. Peck
Attorney

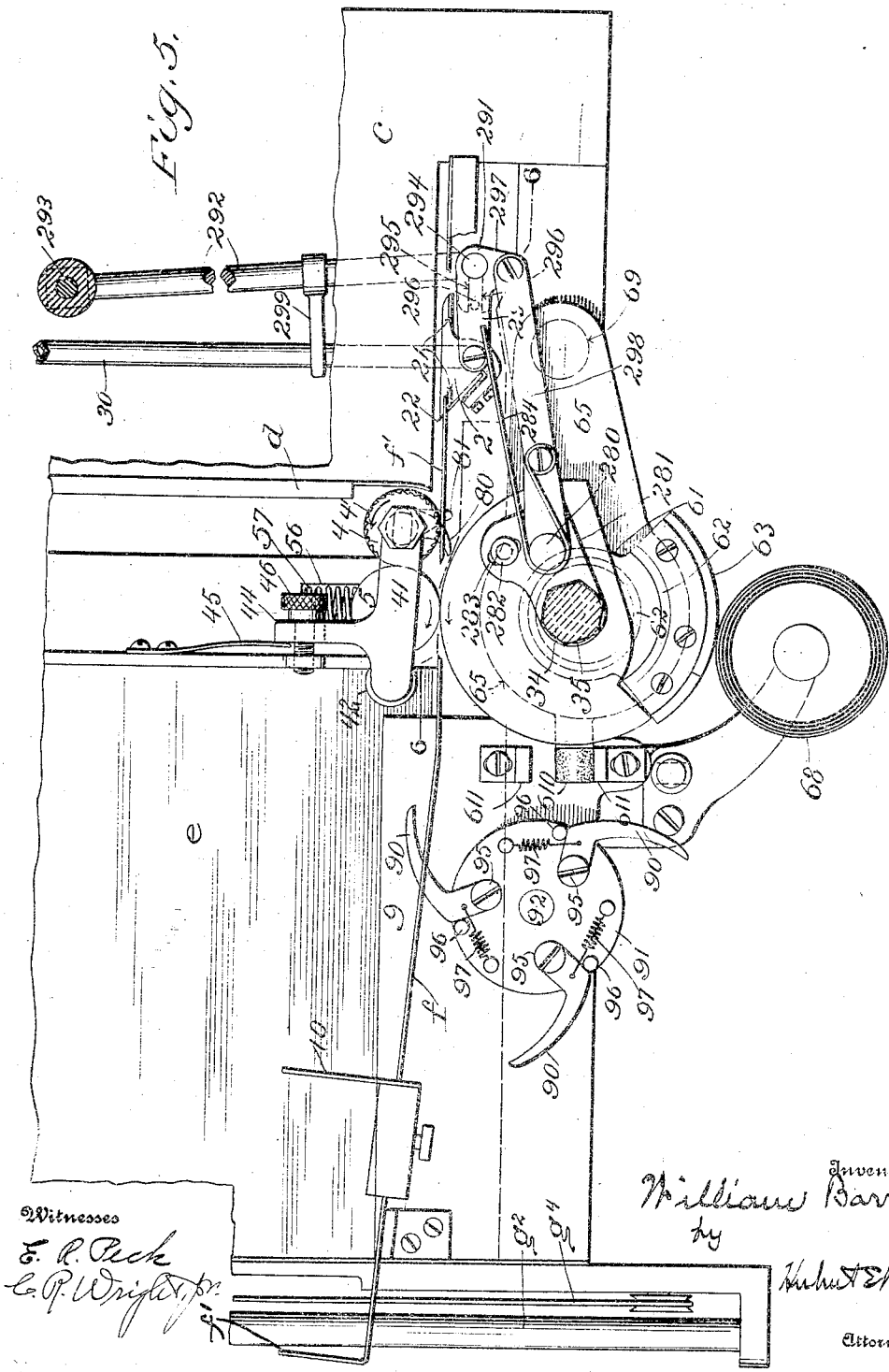

W. BARRY.
MAIL MARKING MACHINE.
APPLICATION FILED MAY 14, 1909.
940,496.
Patented Nov. 16, 1909.
11 SHEETS—SHEET 5.
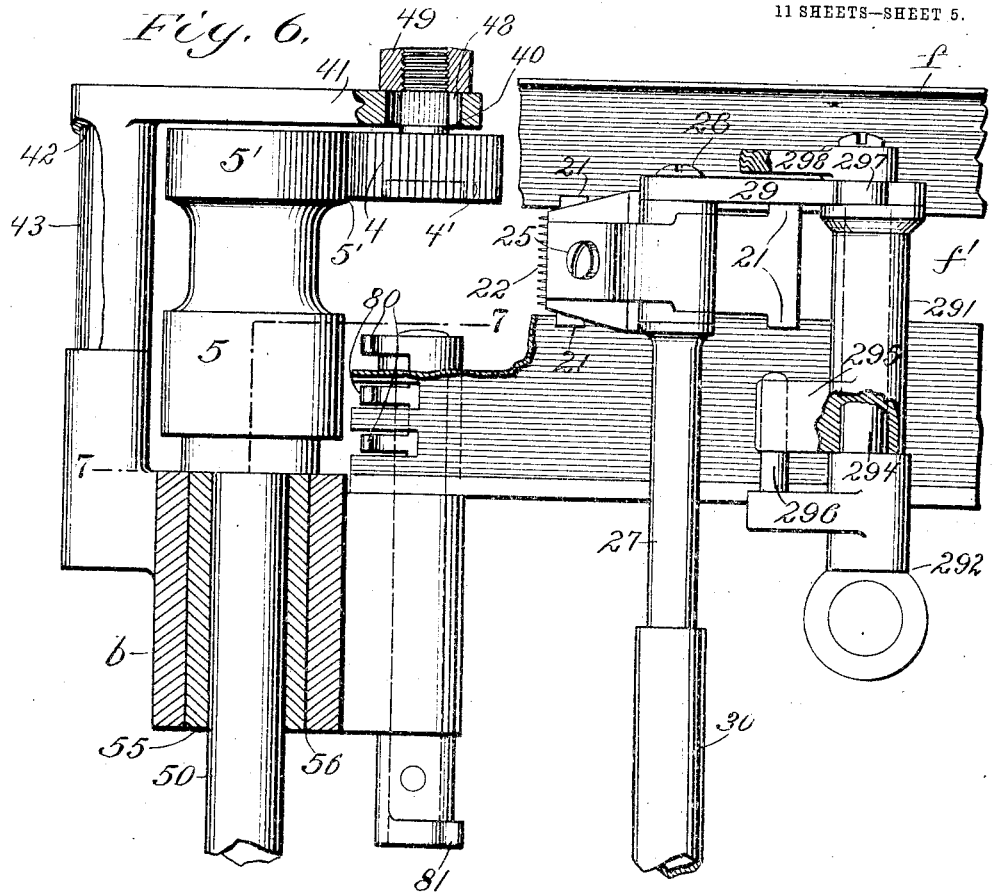
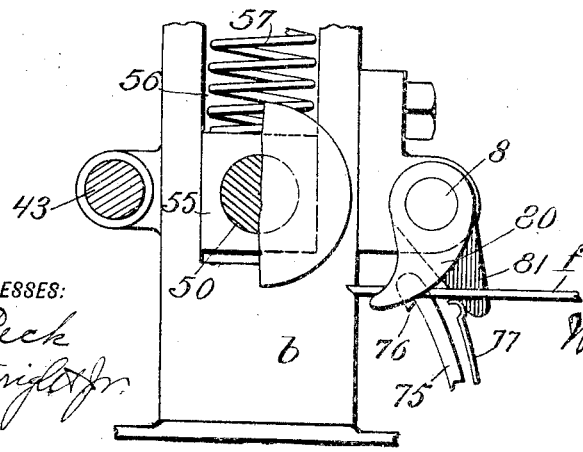
WITNESSES:
E. R. Peck
C. P. Wright Jr.
INVENTOR
William Barry
BY
Hubert E. Peck
ATTORNEY

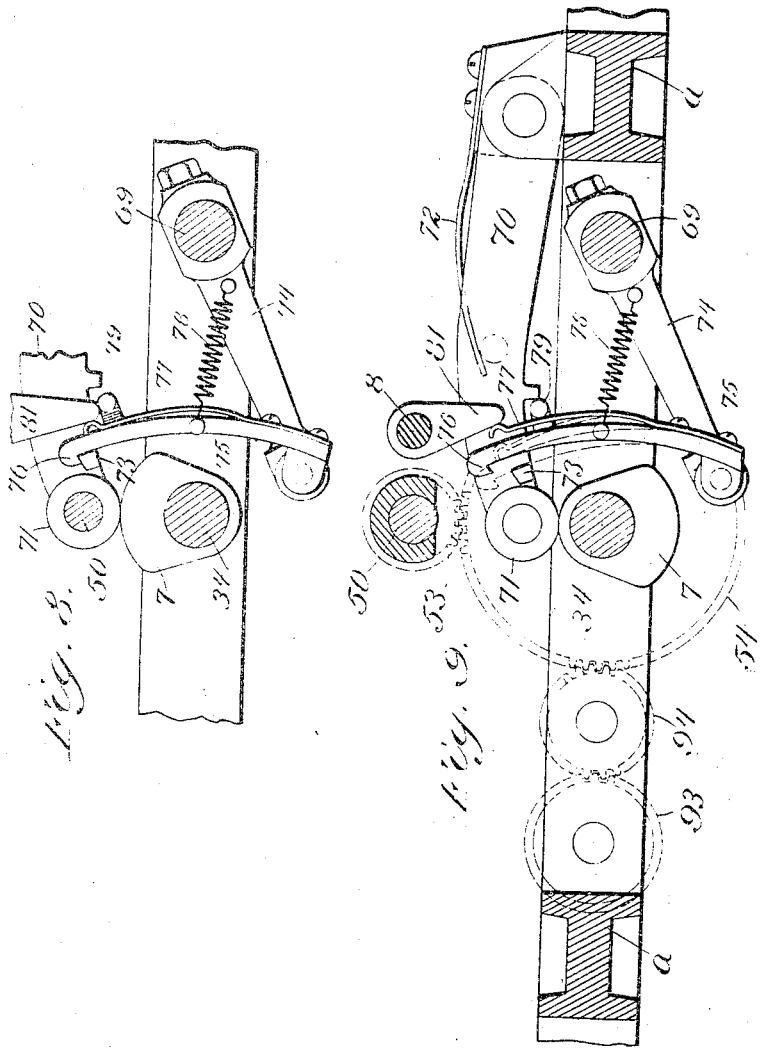
W. BARRY.
MAIL MARKING MACHINE.
APPLICATION FILED MAY 14, 1909.
940,496.
Patented Nov. 16, 1909.
11 SHEETS—SHEET 6.

W. BARRY.
MAIL MARKING MACHINE.
APPLICATION FILED MAY 14, 1909.
940,496.
Patented Nov. 16, 1909.
11 SHEETS—SHEET 7.
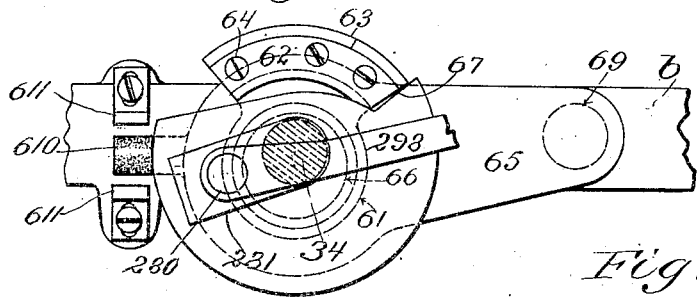
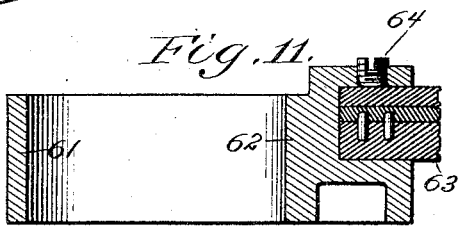
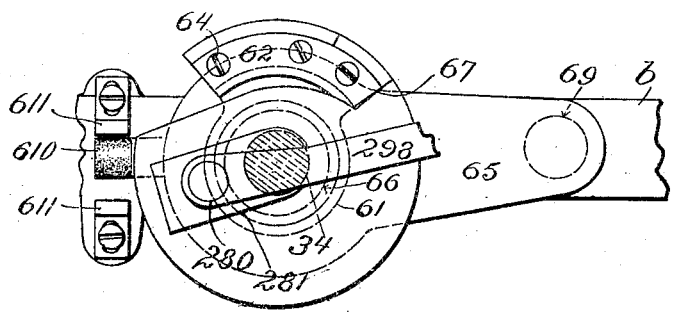
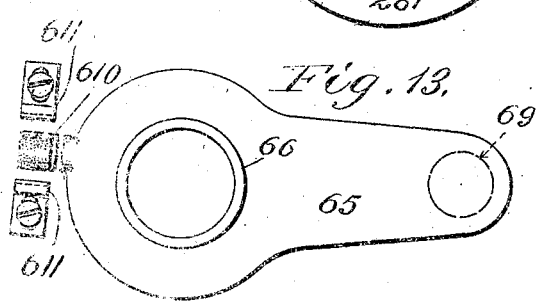
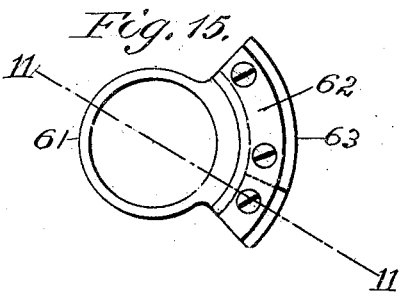
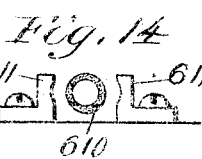
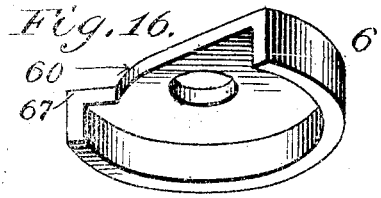
WITNESSES:
E. R. Peck
C. P. Wright Jr.
INVENTOR
William Barry
BY
Hubert Peck
ATTORNEY

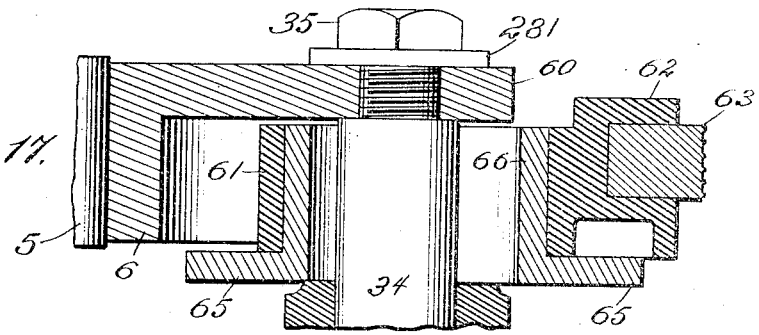
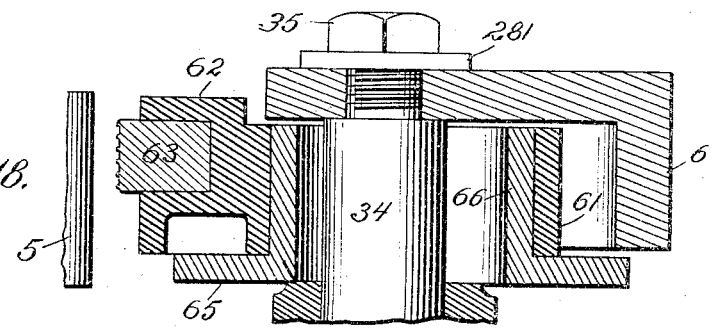
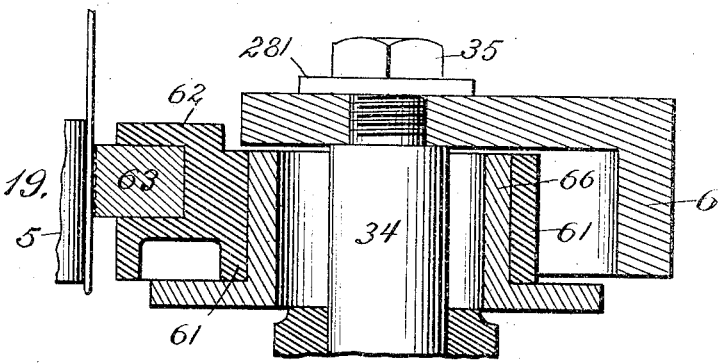

W. BARRY.
MAIL MARKING MACHINE.
APPLICATION FILED MAY 14, 1909.
940,496.
Patented Nov. 16, 1909.
11 SHEETS—SHEET 9.
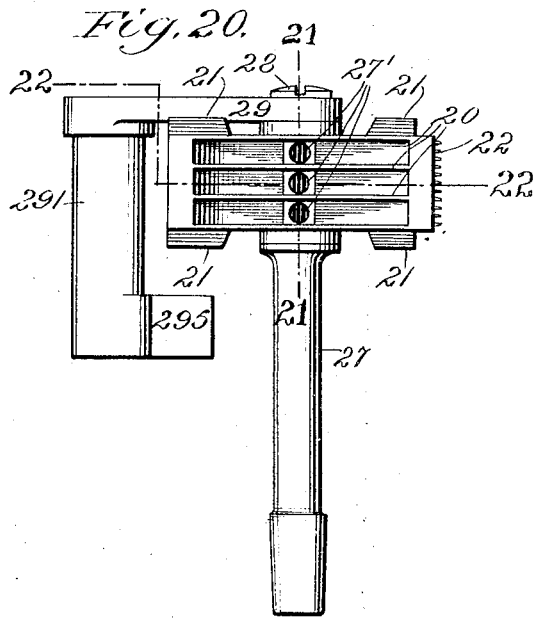
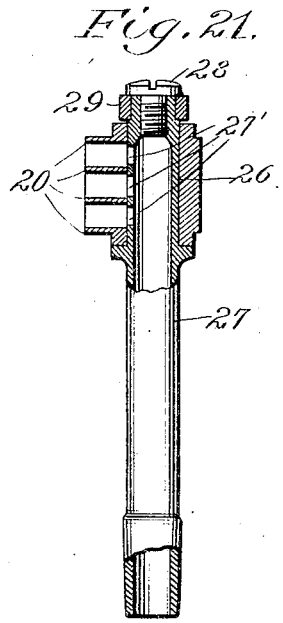
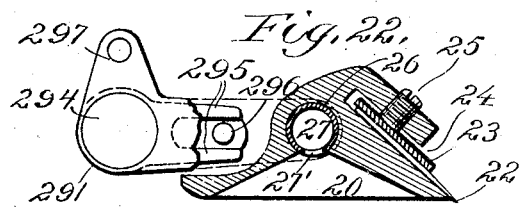
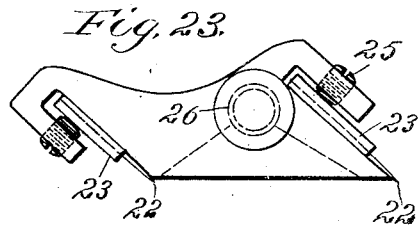
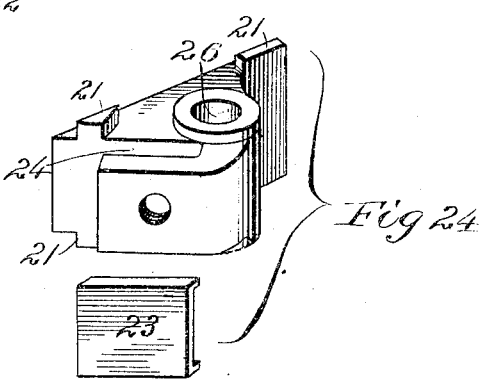
WITNESSES:
E. R. Peck
C. P. Wright Jr
INVENTOR
William Barry
BY
Hubert E. Peck
ATTORNEY

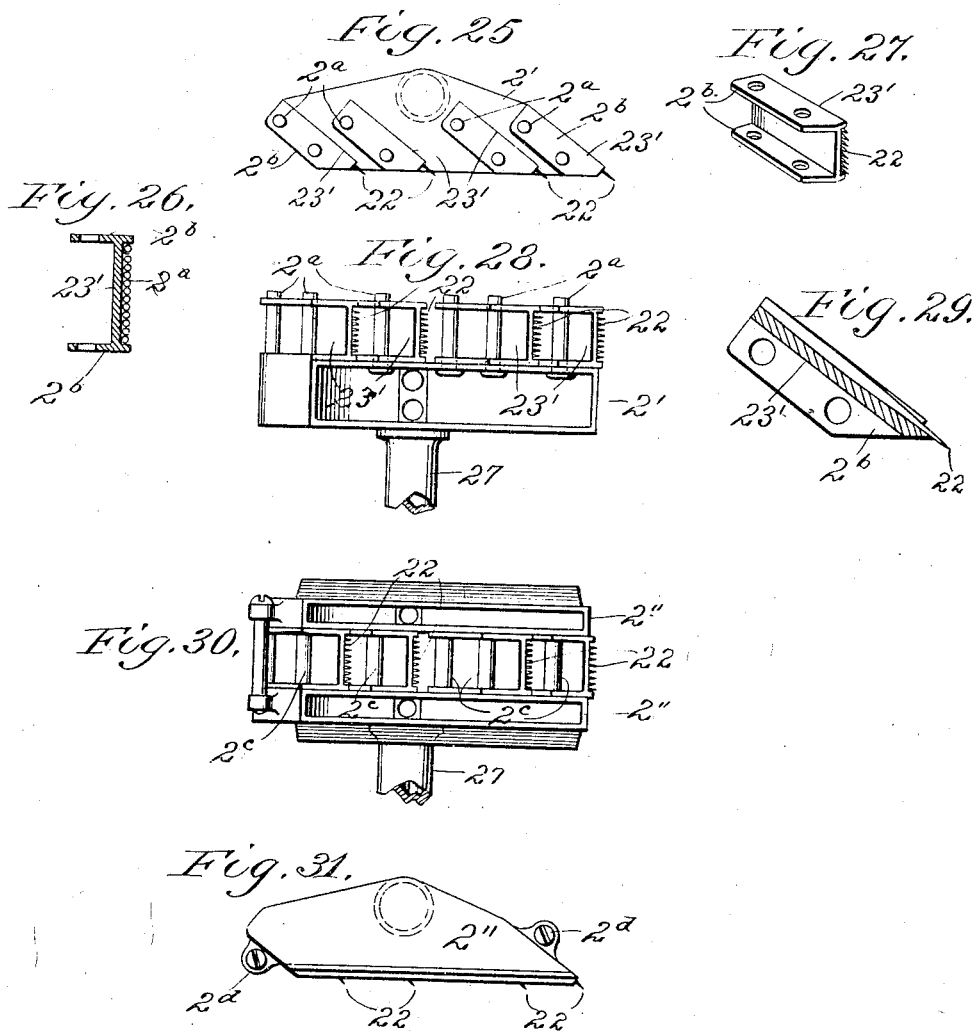

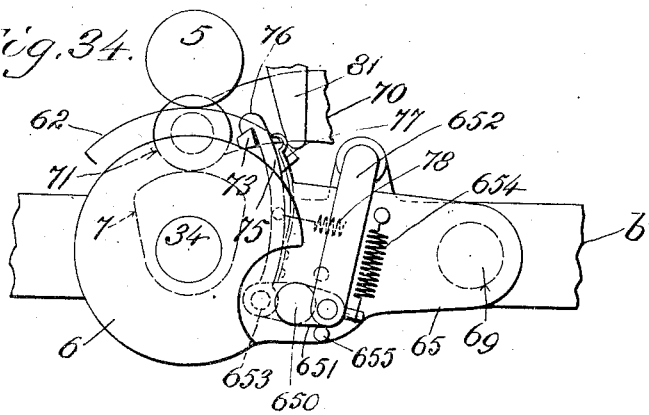
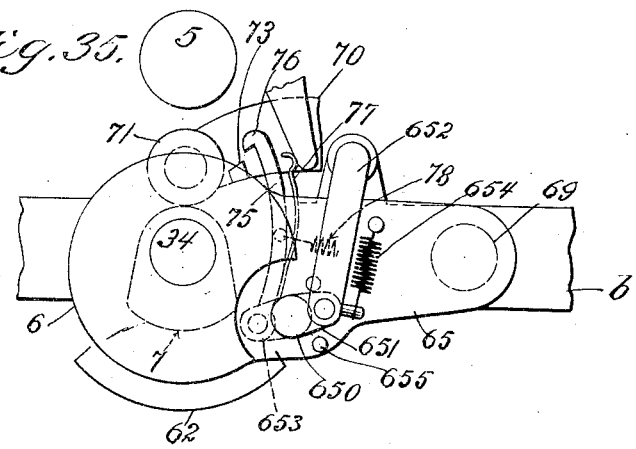
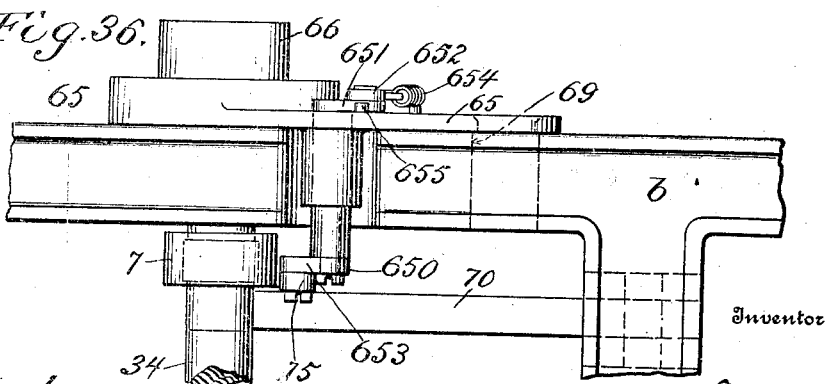

UNITED STATES PATENT OFFICE.

WILLIAM BARRY, OF OSWEGO, NEW YORK.

MAIL-MARKING MACHINE.

940,496.　　　　Specification of Letters Patent.　　Patented Nov. 16, 1909.

Application filed May 14, 1909. Serial No. 495,992.

*To all whom it may concern:*

Be it known that I, WILLIAM BARRY, a citizen of the United States, residing at Oswego, Oswego county, New York, have invented certain new and useful Improvements in Mail-Marking Machines; and I do hereby declare the following to be a full, clear, and exact description of the invention, such as will enable others skilled in the art to which it appertains to make and use the same.

This invention relates to certain improvements in mail marking machines; and the objects and nature of my invention will be readily understood by those skilled in the art in the light of the following explanation of the accompanying drawings showing what I now consider my preferred embodiment from among other formations and arrangements within the spirit and scope of my invention.

My invention consists in certain novel features in construction and in combinations and arrangements of parts as more fully and particularly set forth hereinafter.

Figure 1:
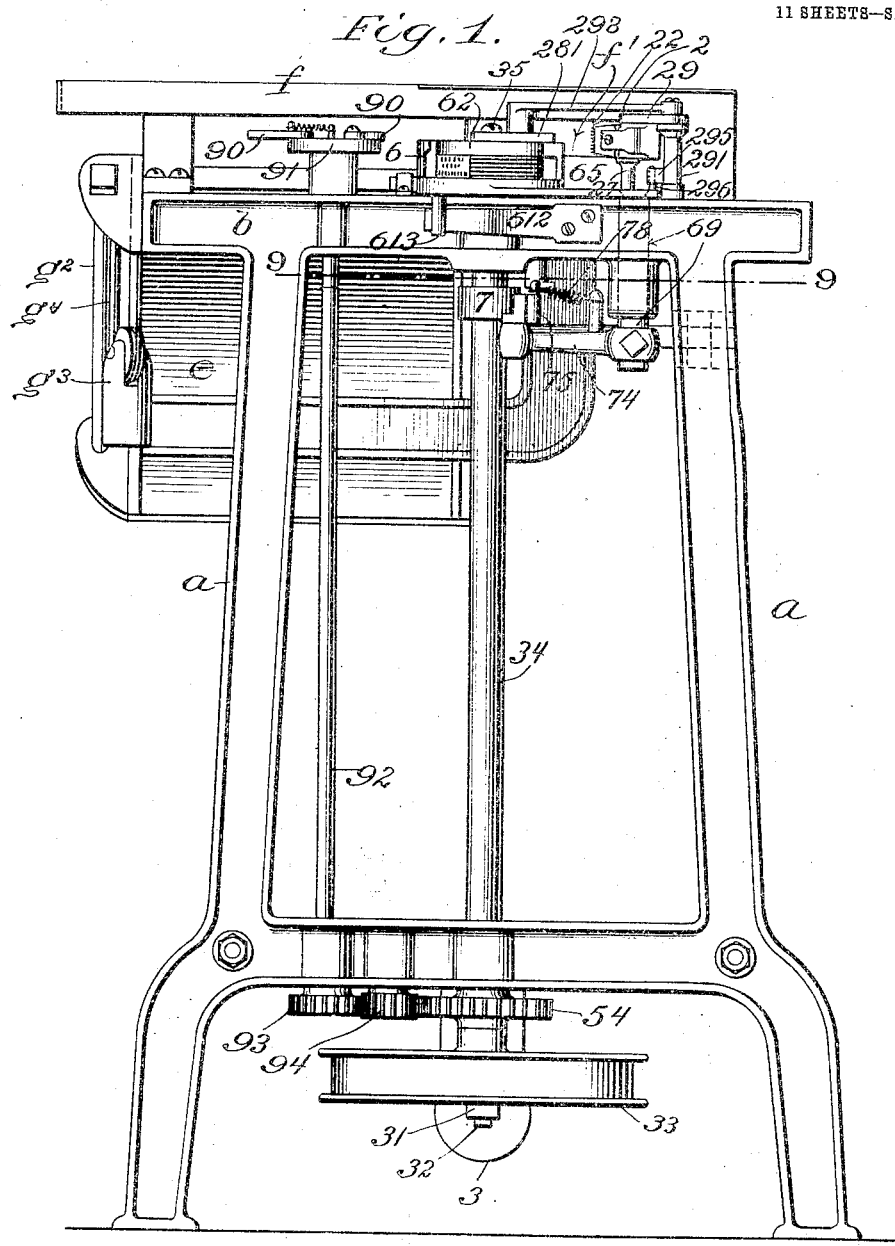
Figure 2:
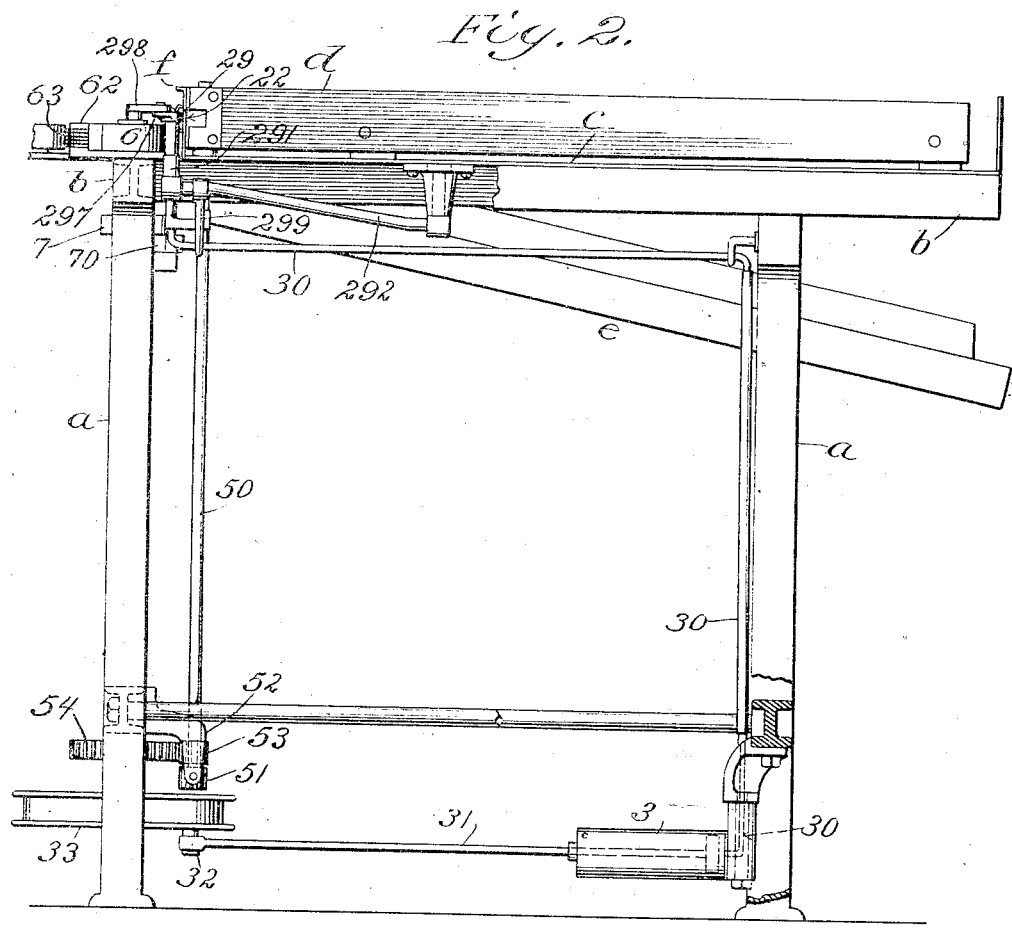
Figure 3:
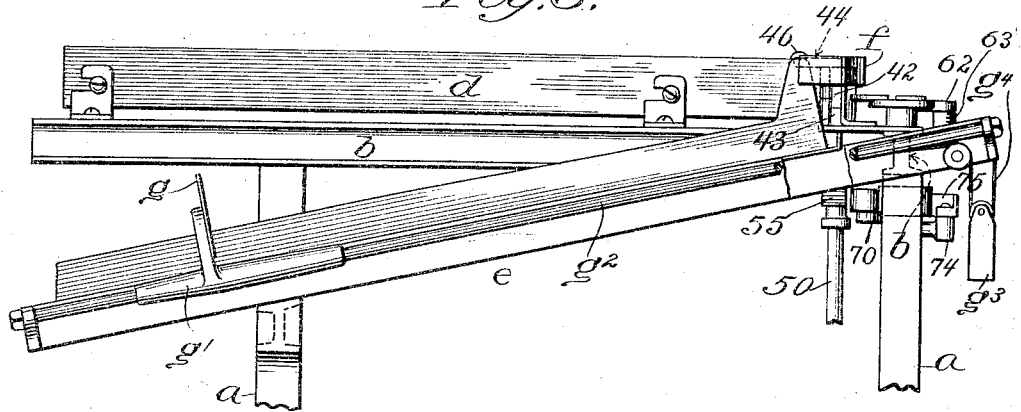
Figure 4:
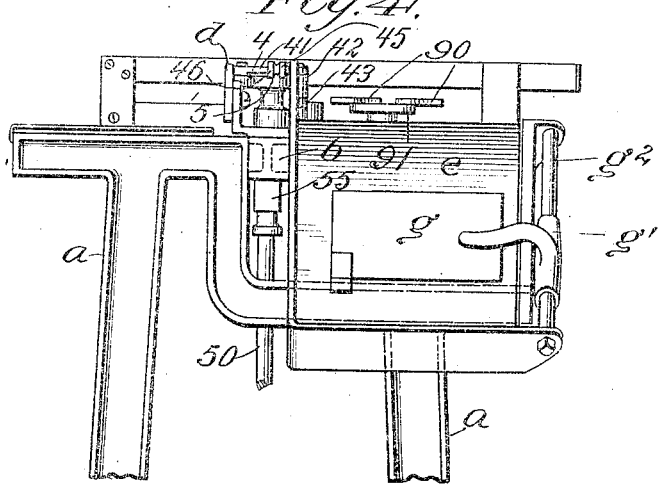

Referring to the accompanying drawings:—Figure 1, is front elevation of my machine Fig. 2, is a side elevation, parts being broken away. Fig. 3, is an elevation, looking at the opposite side of the machine, parts being broken away. Fig. 4, is a rear view, parts being broken away. Fig. 5, is a top plan view of the front part of the machine, parts being broken away. Fig. 6, is a vertical sectional view looking rearwardly and taken in the plane of the line 6—6, Fig. 5. Fig. 7, is a detail horizontal section taken in the plane of the line 7—7, Fig. 6. Fig. 8, is a detail horizontal section showing certain of the parts shown by Fig. 9, in a different position. Fig. 9, is a detail cross section in the plane of the line 9—9, Fig. 1, certain parts being indicated by dotted lines, and certain parts being shown in different positions by dotted and full lines. Fig. 10, is a detail plan view of the printing member or die and its impelling or driving roll, the die being shown in its normal withdrawn, non-printing or inoperative position, dotted lines indicating certain hidden parts. Fig. 11, is a detail vertical section, on an enlarged scale, taken on the line 11—11, Fig. 15, showing the printing element or member and the die or printing devices carried thereby. Fig. 12, is a view similar to Fig. 10, but showing the printing element adjusted to operative position with its die or printing characters brought up to the printing line or plane. Fig. 13, is a detail top plan of the printing element carrier. Fig. 14, is a detail end view of the buffering or stop device for the printing element carrier. Fig. 15, is a detail top plan view of the printing element. Fig. 16, is a detail perspective view of the printing element propelling roll or shell. Fig. 17, is a detail cross sectional view through the printing element propelling roll, and the printing element and its carrier, showing said element and its carrier in normal or withdrawn position. Fig. 18, is a view similar to Fig. 17, but showing the printing element in a position diametrically opposite to the position in which it is shown in Fig. 17. Fig. 19, is a view similar to Fig. 18, but showing the printing element and its carrier moved to effective or operative position with the printing die at the printing point or line and coöperating with the impression roll or surface. Fig. 20, is a detail elevation of the feeder head and its hanger, showing the working or suction face of the feeder. Fig. 21, is a vertical section taken on the line 21—21, Fig. 20. Fig. 22, is a sectional view taken on the line 22—22, Fig. 20. Fig. 23, is a detail plan view of the feeder head or block, showing the same provided with gripping or feeding needles at both ends. Fig. 24, is a detail perspective view of the feeder block of Fig. 20, showing the needle carrier removed therefrom and shown adjacent thereto. Fig. 25, is a detail plan view of a modified form of feeder block. Figs. 26, 27 and 29 are detail cross section, perspective and longitudinal section views of one of the detachable needle carriers or holders. Fig. 28, is a face view or front elevation of the feed block of Fig. 25. Fig. 30, is a face view and Fig. 31, a top plan view of still another form of feed block or head. Fig. 32, is a detail sectional view enlarged of the pump piston, the cupped washer of said piston being shown in its normal position by dotted lines, the full lines showing the position of said washer being forced into the pump barrel. Fig. 33, is a detail elevation of the pump, parts being broken away. Figs. 34 and 35, are detail top plan views somewhat diagrammatical, showing a different construction, from that illustrated by Figs. 8 and 9, for throwing the printing element into and from printing position; Fig. 34 showing the parts holding the printing element up to printing position and Fig. 35, shows the parts restored to normal positions with the printing element in position to engage the inking roll. Fig. 36, is a detail front elevation showing a portion of the machine frame front, the printing roll shaft, the printing element carrier (the printing roll and element being removed) and the controlling structure of the two preceding figures.

In the drawings, $a$, are frame uprights or standards carrying the top frame members $b$, supporting the letter feed bed or way $c$, in which the letters (mail matter) to be imprinted or marked are placed after having been properly faced.

The letter way $c$, is usually longitudinally open at the top and at its outer side while longitudinal guide or stop wall $d$, is arranged along its inner longitudinal side to guide the mail matter and against which the inner ends of the letters can be alined.

$e$, is a letter bed or way into which the marked letters are discharged from the printing mechanism and in which they are stacked. This way $e$, can, if so desired, be inclined downwardly and rearwardly from its front end to its lower or rear end, and the two ways $c$, $e$, are arranged approximately side by side, although the feed way $c$, is usually horizontal, and both extend rearwardly from the front of the machine and at their front ends terminate at the transverse vertical front wall $f$, arranged across the front end of the machine. In rear of said wall a throat or passage is provided through which each letter is fed transversely from the front end of the feed way into the front end of the receiving way to be there engaged by a suitable stacker and forced rearwardly to proper position in the receiving way.

$g$, is a support or follower movable longitudinally of the receiving way to uphold the bundle of letters therein. This follower is rigid with sleeve $g'$, sliding on longitudinal guide rod $g^2$, and said follower is counterbalanced by weight $g^3$ connected to the follower sleeve by cord $g^4$, although I do not wish to so limit my invention.

The bundle of letters to be marked is pressed forward on the bed $c$, against the front wall $f$, and the inner ends of the letters are alined against the wall $d$, so that a suitable feeder can, at each stroke, move the foremost letter laterally from the pile and into the throat to the printing mechanism. Any suitable means can be provided to press the letters forwardly on the bed $c$, and against the front wall $f$, although as at present advised, I prefer to do this by hand. In the specific example illustrated, I employ a reciprocating feeder utilizing both suction and gripping or other positive means for successively taking hold of and feeding the letters from said way.

The feed block or head is arranged in front of the wall $f$, and reciprocates longitudinally thereof and is guided thereby and projects through longitudinal slot or opening $f'$, in said wall to engage the foremost letter on the bed $c$. The feed block or head 2, is longitudinally or horizontally elongated and is hollow or open at its working face, said face being longitudinally traversed by spaced parallel ribs 20. The working face of the block projects rearwardly through the slot $f'$, in wall $f$, into working engagement with the foremost letter behind said wall and the ends of the head are provided with upwardly and downwardly projecting stop and guide projections 21, extending above and below the slot $f'$, and bearing against and sliding along the rear face of the wall $f$.

The feed block forms a pneumatic suction cup or head, being open at its rear or working face only except for the suction connection, said open face being divided by said ribs or support 20, to support the letter engaged and prevent it from being torn or unduly drawn or bulged into the head by the suction. At one or both ends or at intermediate points, the working face of the feed block can be provided with friction or biting means for positively taking hold of and forcing the letters. Various friction means can be employed for this purpose although in the specific example illustrated, I show single rows of projecting points such as needle points. For instance, in the form shown by Figs. 5, 20, 22, and 24, the front end of the feed block is armed with a single transverse row of projecting forwardly inclined needle points 22. In Fig. 23, I show the feed block provided with two transverse rows of projecting points 22, arranged at opposite ends of the block, respectively, in front of and behind the suction face. Each positive or biting element can be removably secured to its feed block and in the example illustrated, consists of a single row of parallel needles 22, soldered to and longitudinally of a plate 23, between the longitudinal edge flanges thereof with the points of the needles projecting slightly beyond one end of the plate. The feed block can be formed with a socket 24, at one end to receive said needle plate and a set screw 25, for removably clamping the plate therein. If so desired, such sockets can be arranged at both ends of the block as shown by Fig. 23.

In the specific example illustrated, the feed block is formed with a central journal opening or bore 26, extending vertically therethrough and having a lateral suction opening into the concavity or inner chamber of the suction cup or face (Figs. 21, 22). The feed block is mounted to rock or oscillate horizontally on the upper journal end of a hollow vertical spindle or suction pipe 27, fitted in said bore 26, and having lateral suction ducts or openings 27', to the spaces between the ribs 20. The pipe 27, is formed with a shoulder on which the feed block rests, while the upper end of the pipe projects above the feed block and is closed by screw 28, having a projecting head maintaining the hanger arm 29, loosely on the upper end of the pipe (Figs. 20, 21).

The pipe 27 is connected with any suitable air exhausting device through the medium of suitable pipe connections or the like. For instance, I show air pipe connections 30 to the air pump 3, mounted in the lower portion of the frame a. The pipe connections 30, comprise flexible sections to permit the top length thereof to swing with the feeder. I show a reciprocating pump 3, for exhausting air from and reducing the pressure in pipe connection 30 and the feed block when the feed block is performing a feed stroke and for restoring pressure or creating an outblast of air from the feed block and against the foremost letter on bed c, when the feeder is on its return or back stroke, although I do not wish to so limit all features of my improvements in feeders.

The reciprocating piston of the pump is connected by its rod 31, to crank pin 32, on the pulley 33, rigid with vertical main shaft 34, of the machine, and the arrangement of the pump actuating connections with respect to the feeder actuating connections is such that the pump piston performs its suction or air exhausting stroke while the feeder is performing its feed stroke, and the pump piston performs its return stroke driving air through the connections 30 and out through the suction face of the feed block and against the letters to hold them from said suction face, when the feed block is performing its return stroke.

In Fig. 32, I show a construction of piston which can be advantageously employed in the air exhausting pump. This piston consists of flanged, trunk or hollow piston head 3', having radial perforations 3'', through its flange. The piston washer 3³, is clamped against the inner end of the piston head and is formed to cup outwardly around said flange and as the piston moves outwardly air will pass through perforations 3'', and tend to hold the piston tightly to the cylinder wall, to prevent leakage.

If so desired, the outer ends of air inlet 3'', can open into an annular groove, as shown in Fig. 32, around the circumference of the piston flange and at the inner face of the extended cupped portion of the piston washer as shown by dotted lines in Fig. 32.

The feed block is upheld by and reciprocated through the medium of a hanger comprising vertical socket 291, rigid with lateral arm 29, projecting horizontally from the upper end of the socket and at its outer end having a vertical opening in which the upper end of the pipe or spindle 27, is journaled and by which the feed block is upheld through screw head 28 or other means, as hereinbefore described.

The hanger is supported and carried by a radial swinging arm 292, extending rearwardly beneath the bed c, and at its rear end journaled on a vertical stud 293, rigid with the frame, while at its front or free end said arm is provided with a vertical stud 294, entering the socket 291, and on which stud said socket oscillates. The hanger is provided with spaced, lateral stop lugs 295, between which is arranged a pin 296, rigid with a lateral projection of the swinging arm 292, (Fig. 6) for the purpose of limiting the otherwise free lateral swing of the hanger on the stud 294, as a center.

The hanger is usually formed with a forwardly extending arm 297, to which one end of feed block actuating pitman 298, is pivotally joined, while the opposite end of said pitman is pivotally mounted on crank pin 280, rigid with crank arm 281, clamped to the upper end of vertical drive shaft 34, by nut 35. The radial position of the crank arm 281, with respect to the shaft 34, and a member of the printing couple mounted on said shaft can be varied, to regulate or time the feed stroke of the feed block with respect to the movement of said printing member, by means of set screw 282, and slot 283, on loosening the nut 35.

In the particular example illustrated, the feeder block is arranged in advance of the radial arm stud 294, in the direction of feeding stroke, and hence to yieldingly hold the block-carrying end of the hanger rearwardly and the block toward the letters during the feed stroke, I provide spring 284, carried by the pitman 298, and so arranged that when the pitman moves toward the feed block and starts on its operative or feeding stroke, the free end of said spring will bear inwardly (rearwardly) against the feed block and yieldingly hold the same to the foremost letter on the bed c, and at the same time the pull of the pitman on the hanger will tend to rock the hanger to hold the feed block to its work. When the pitman moves away from the feed block to perform the return stroke, the free end of spring 284, will move outwardly from effective engagement with the feed block, and also the push of the pitman will tend to swing the hanger to throw the feed block forwardly and away from the face of the letter just delivered to the printing mechanism and from the next letter on the bed c, and at the same time the suction through the feed block is not only cut off, but a repelling or outward blast or draft will be delivered through the feed block against the letters on the bed c, to prevent effective engagement thereof with the feed block while on its back or return stroke.

The arm 292, swings with and carries the feed block and said block is enabled to travel in its proper path by reason of the jointed connection between said arm and the block.

The upper horizontal length of the pipe connection 30, also swings with said block, and if so desired, said length of the pipe connection can be supported from arm 292, by a hook or hanger 299.

In the form of feeder shown in Figs. 25–29, the hollow feed block 2', is formed with a single horizontally elongated narrow suction opening, and rows of rigid vertical pins 2$^a$, project up from the top wall of block to removably-receive series of parallel needle carrying plates 23', each having needles secured thereto with their points 22, projecting from the ends thereto as described in connection with Figs. 20–24. Each plate is formed with longitudinal flanges 2$^b$, perforated to receive the pins 2$^a$, with the plates resting on the top wall of the block in parallelism and inclined forwardly and spaced apart to present widely spaced vertical or transverse rows of biting points arranged at the ends and intermediate portions of the block and adjacent to the suction opening. Any plate of needles can be lifted off and renewed in event of damage.

In Figs. 30 and 31, I show a series of the needle plates such as shown in Figs. 25–29, arranged between two parallel suction mouths 2'', 2'', and removably fitted on pins 2$^c$. In this form the feed block is formed in two parallel longitudinal sections 2'', removably secured together by screws 2$^d$, with the needle plates and pins 2$^c$, clamped between said sections. By removing the screws 2$^d$, the upper section can be lifted off so that any needle plate can be removed and a new one inserted.

The forms of feed blocks shown by Figs. 25–31, are mounted and operated as hereinbefore described in connection with Figs. 20, etc.

At each feeding stroke, the feed block grasps the foremost letter of the bundle in the feed way and forces the same longitudinally of the front wall $f$, past the separating mechanism, and to the printing mechanism which positively takes hold of the letter and carries the same forward and discharges it into the front end of the discharge or receiving way.

The separating mechanism comprises a horizontally disposed reversely rotating roll 4, arranged behind and yieldingly held forward to the wall $f$, in the letter throat or passage from the feed way to the printing mechanism. Said separating roll is designed to hold back the letter or letters immediately behind the letter in the grasp of the feeder, and to overcome the natural tendency of the letter behind the foremost letter to adhere thereto and move laterally therewith, or in other words to prevent more than one letter being fed by the feeder at each stroke. The separator can be composed of a comparatively small idler metal roll 4, having its letter engaging surface 4', milled to form vertical ribs or teeth beveled rearwardly or in the direction of movement of the roll, at its letter engaging portion. The roll extends across the letter throat just in advance of the printing mechanism and is constantly rotated by suitable means so that its front or letter engaging portion moves in a direction opposite to the direction of movement of the letter being fed by the feeder and bears against the rear face of said letter. In fact, said roll opposes the advance of said letter and is forced rearwardly by the advancing letter and is thereby pressed forwardly against wall $f$.

In the specific example illustrated, the separator roll is in frictional driving contact with and is driven by the friction surface 5', of an upward or top extension of the soft constantly rotating impression roll 5.

The separating roll is freely turnable on and is supported by vertical spindle 40, depending from horizontal hanger or bracket 41, extending across but separate from the impression roll and at its end opposite the separator roll having vertical socket 42, loosely fitted on vertical stud or pin 43, rigid with the frame work of the machine.

44, is a rearwardly extending lateral arm rigid with bracket 41, and at its free end engaged by spring 45, to yieldingly rock the bracket on pin 43, to hold the separator roll to the wall $f$, or to the letter.

The swing of the bracket and movement of roll 4, toward wall $f$, can be controlled or varied by adjustable headed stop screw or pin 46, passing loosely through a slot in bracket arm 44, and into an adjacent wall or portion of the frame, such as the inner longitudinal guide or stop wall of the receiving or discharge letter way.

The axis of the separator roll is preferably adjustable radially of the axis of the impression roll. For instance I show the outer end of bracket 41, formed with a longitudinal slot 48, through which the squared end of spindle 40, passes and in which it can be adjusted longitudinally on loosening clamping nut 49 on the threaded upper end of the spindle, as will be readily understood by those skilled in the art.

The impression roll 5, including its friction driving extension 5', is soft, being usually composed of a suitable soft rubber composition, although felt or other suitable yielding material can be employed. The roll above the impression portion 5, is usually reduced in the horizontal plane of the feeder to avoid possibility of injurious contact with the feeder gripping points. The impression roll is fixed on the upper end of a constantly rotated impression roll shaft 50, which in the example illustrated, is mounted at its lower end in a step block or bearing 51, pivotally hung to swing on a horizontal axis from a bracket 52, at the lower portion of the machine frame (Fig. 2) to permit swing or yielding of the upper end of the shaft to accommodate the movement of the impression roll toward and from the printing element as the letters pass.

The impression shaft 50, is geared to and driven from the printing element shaft 34, through the medium of meshing gears 53, 54.

The upper end of the impression roll shaft is mounted in and passes through vertical journal box 55, arranged in and movable longitudinally of horizontal slot 56, in the machine frame to permit the movement of the impression roll and its shaft in accommodating letters of different thicknesses.

57, is an expansive spring bearing against box 55, and yieldingly pressing the same forwardly to hold the impression roll and its shaft up to properly press the letters to the printing element and to permit the desired yielding movement of said roll.

It is desirable to employ a soft or yielding impression surface because of the clear imprint on the letters attained where such surface is employed, but such surface is peculiarly susceptible to receive and smear ink on the letters causing the objectionable "off-set", should the printing surface or die come in contact with the soft impression surface when no letter is interposed. It is hence desirable, where the soft impression surface is used, to employ means permitting the printing die or element to move up to printing position or to the printing line only when a letter is interposed between said die and the impression surface.

As an example of means which can be advantageously employed for this purpose, I show the printing element separate from the feeding portion of the printing roll although propelled in its encircling path thereby, and said element is also normally withdrawn from printing position and from possibility of engaging the impression surface, although the printing roll itself is constantly maintained in coöperating relation with and to the impression surface. For instance, the vertical drive shaft 34, is shown as forming the printing roll shaft and is mounted in fixed bearings and its upper end projects above the front ledge or horizontal top portion of the frame to receive the printing roll. The roll proper consists of a hollow shell 6, having a horizontal top wall and a depending circumferential flange. The upper end of drive shaft 34 passes removably and centrally through the horizontal wall of the roll and the roll is clamped thereto to constantly rotate therewith, as by nut 35.

The circumferential portion of the roll 6, is formed to coöperate with the impression roll, which is constantly pressed thereto, to grip the letters from the feeder and discharge the same into the receiving way. In other words, the impression roll and roll 6, are constantly maintained in coöperating letter feeding position and relation and are constantly driven, the movement of the impression roll toward roll 6, being limited by the engagement between box 55, and the front end wall of slot 56.

The top wall and circumferential flange of the roll 6, are segmentally mutilated or cut-away at 60, to expose the interior chamber thereof and to receive the normally withdrawn printing element and permit the radial adjustment or shifting thereof. The printing element consists of an enlarged vertically open bearing sleeve or ring 61, rigid with and extending rearwardly from a segmental type or die holder 62, at its outer curved face radially socketed or otherwise formed to receive type or any suitable printing characters or devices 63. Where removable type are employed clamping screws 64, or other means can be utilized to removably secure the type in the holder. I herein term the holder and its type or other printing characters whether fixed or removable or both, as the "die" or "printing die".

The printing element is arranged within the roll 6, below the top wall thereof and with the die occupying the cut out portion of the roll, while the sleeve 61, is arranged about centrally beneath the top wall of the roll surrounding and of considerably greater diameter than the upper part of the shaft 34. The printing member sleeve 61, is centered on and rotates around the upwardly projecting cylindrical hub or bearing boss 66, of a horizontal plate or carrier 65 arranged beneath the roll 6, and carrying the printing element. The hub or boss 66, is vertically open or hollow for the passage of the shaft 34, and the diameter of the open center of the hub is so much greater than the diameter of the shaft passing up therethrough as to permit lateral swinging movement of the carrier 65, independently of the shaft 34 and roll 6, to carry the printing element to and from printing or operative position. The printing element rests and rotates on the top face of the carrier and the sleeve 61, concentrically embraces and rotates on the hub 66. The printing element is rotated by and with the roll 6, by the loose engagement between the radially arranged end wall 67 of the cut-out portion of the roll and the corresponding end of the printing element type holder.

In its normal position, with respect to the roll 6, and the impression surface, the printing element is withdrawn into the roll 6, with the printing die arranged inwardly and moving in a circle of the same radius as the circle of the outer letter or impression surface engaging circumference of roll 6, (see Figs. 10, 17, 18), but eccentrically thereto whereby the printing die will be spaced from the impression surface and will pass the same with ample clearance to avoid depositing ink thereon.

The feed block reciprocated by the pitman connection from shaft 34, is timed to deliver a letter to the printing couple as the die comes opposite the impression surface or approaches printing position, to insure imprint of the die at the proper point or location on each letter. Controlling means are provided, whereby as a letter forced by the feeder approaches the printing couple, mechanism will be operated to move printing-element-carrier toward the impression roll and thereby shift or move the printing element radially and outwardly within roll 6, until the working face of the die has been projected into the circle of the outer circumference of roll 6, and into position to coöperate with the impression surface, in properly imprinting the letter passing between said rolls, see Figs. 12 and 19, said die having received ink from inking roll 68.

The carrier 65, is in the form of a horizontal swinging frame at its free end carrying the printing element and at its opposite end rigid with vertical rock shaft 69, passing down through and journaled in the front shelf of the machine frame. The swing of the carrier 65, is limited and the carrier is cushioned by buffer 610, projecting from the free end of the carrier between adjustable stops 611, on the frame top. The carrier 65, is normally and yieldingly held to its limit of forward swing with the printing element in withdrawn or inoperative position, by the spring 612, secured to the frame and engaging stop 613, rigid with the free end of the printing element carrier.

Means are provided for swinging carrier 65, to move the printing element to operative position as a letter passes to the printing couple.

In the specific example illustrated, a cam 7, is fixed on constantly rotating printing roll shaft 34, with the high portion of the cam edge arranged about directly below the die of the printing element.

A horizontally swinging arm 70, is pivoted at one end to the frame with its free end carrying roller 71, held yieldingly bearing forwardly against the cam edge by spring 72, so that the free end of the arm or lever 70 is swung rearwardly at each revolution of shaft 34, by the high portion of the cam as the printing element is about reaching and is passing the impression surface, and as said arm is swung forwardly by spring 72, as the roller reaches the low portion of the cam. The arm 70 is provided with a tooth or shoulder 73, projecting upwardly from the end portion of the top face of the arm.

74, is a horizontal arm fixed to and extending laterally from the lower portion of rock shaft 69, in front of and in about the same direction as arm 70.

75, is a laterally swingable hook, link or pull connection at its front end joined by a vertical pivot to the free end of lateral arm and from thence extending rearwardly and horizontally across and resting on top face of the free end of swinging lever 70, adjacent to the tooth 73. The link 75, is at its free end formed with a notch or lateral shoulder 76, in rear of the tooth 73.

77, is a plate spring secured to the link 75, and having a free end springing away from the edge of the link.

78, is a coiled expansion spring secured to arm 74 and link 75, and constantly tending to hold the link to its limit of outward swing with spring 77, bearing against stop 79 and shoulder 76, out of the path of movement of tooth 73. The arrangement is such that when the link 75, is in its normal position, full lines Fig. 9, the lever 70, will swing back and forth following the edge of cam 7, without disturbing the position of arm 74, but should link 75, be swung to the left (Figs. 8, 9) the slight distance necessary to bring shoulder 76, into the path of movement of tooth 73, the lever 70 on its rearward swing will (through the medium of tooth 73, and shoulder 76) pull the link 75 rearwardly and thereby swing arm 74 rearwardly and rock shaft 69, to swing the carrier 65, rearwardly and move the die in the roll 6, to printing position as the letter enters between said die and the impression roll. The length of the high portion of cam 7, is such as to hold the parts to maintain the printing die in printing position until the die has traversed its full length on the letter and has passed beyond the letter, and thereupon the lever 70, following the reduced portion of the cam, will swing forwardly, permitting the carrier 65 and arm 74 to swing forwardly and back back to normal position under the impulse of spring 612.

In its normal position link 75, is arranged outside of the path of movement of tooth 73, and consequently the arm 74 and lever 70 are normally operatively disconnected.

I provide mechanism actuated by each letter as it passes the separator roll on its way to the printing couple, for establishing operative connection between lever 70 and arm 74. For instance, in the specific example illustrated, I show a vertical rock shaft 8, mounted in and extending above and below the transverse front shelf of the frame and usually arranged directly below the separator roll 4. The upper end of said rock shaft projects upwardly in front of the wall *f*, and below the separator roll and is provided with one or more lateral cams or curved fingers 80, traversing the letter path or throat between the feedway *c*, and the printing couple. These fingers at their front letter engaging edges incline or curve outwardly and rearwardly, in the direction of movement of the letters toward the printing couple, so that each letter while gripped and forced by the feed block will engage said curved edges of the fingers and press the same rearwardly to permit passage of the letters, thereby oscillating the shaft 8. This oscillation of the shaft 8, causes a lateral toe 81, rigid with the lower end of the shaft and closely adjacent to the link 75, and the spring 77, thereof, to move into operative engagement with the free end of said spring 77, and thereby swing the link 75, to the tooth 73, as shown by Fig. 8, and hence establish connection between lever 70, and arm 74, to move the printing die to printing position for imprinting the letter pressing back fingers 80. As soon as the letter passes fingers 80, spring 77, acting in conjunction with spring 78, will restore toe 81, and the fingers to their normal positions, and the printing die will return to normal withdrawn position so that if on the next stroke of the feed block no letter is carried thereby, the die will not engage or deposit ink on the impression roll and the lever 70 will freely oscillate back and forth without moving arm 74. The letter engaging cam or finger of the rock shaft 8, guards the passage to the printing couple and is operated by each letter passing thereto to cause the printing die to meet each letter at the printing position.

The operative movement of the cam or finger 80, is very slight and but little force or pressure is required to move the same, and hence the resistance offered to the passage of the letters is not sufficient to cause damage thereto.

In the specific example illustrated, the letter engaging cams or fingers 80, are arranged directly below the separator roll 4, but are spaced a distance therefrom to permit free passage of the feed block between said roll and the finger or fingers. The finger or fingers project forwardly across the letter throat and hence when swung back by a letter will bear against the rear face of such letter below the separator roll which is also bearing against the rear face of the same letter. The finger (or fingers) 80, hence acts as a separator device, aiding in holding back letters behind the particular letter being fed and thus coöperates with the separator roll 4, and furthermore said finger resists the advance of the letter being fed by engaging its lower portion and prevents possible tendency of the letter to tilt or wedge by reason of the friction applied to its upper portion by the separator roll.

The printing element moves in a circular path eccentric to the center on which the printing roll, proper, rotates, and the inking roll 68, is arranged beyond the circle of movement of the letter engaging and feeding circumference of the printing roll so as not to engage the same. However, the die of the printing element on each rotation, moves out to engage the inking roller even though said die may on each rotation be moved out to printing position, which position is usually diametrically opposite the inking roll engaging position.

Various devices and arrangements can be employed for establishing operative connection between the printing element carrier 65, and the cam controlled lever or arm 70, for projecting the printing element to printing position. For instance, the arm 74, of Figs. 8 and 9, and the buffer 610, 611, can be dispensed with and the parts can be arranged to reduce noise or hammering to the minimum.

In Figs. 34–36, a construction is shown wherein the carrier swings on axis 69, and carries a vertical axis or shaft 650, mounted in the carrier to rock or oscillate therein and to extend from a point above to a point below the carrier. The upper end of this shaft is rigid with horizontal crank or lateral arm 651, at its outer end pivotally joined to the front end of horizontal link 652, at its rear end pivotally joined to the frame so that its front end can oscillate on a vertical axis. At its lower end, the rock shaft 650, is provided with lateral or crank arm 653, extending in the opposite direction from arm 651, and at its outer end pivotally joined to the front end of hook or link 75, whereby connection is established with lever 70, in the manner as hereinbefore described in connection with Figs. 8 and 9.

When hook 75, is by the passage of a letter through the separating devices, thrown into operative engagement with lever 70, arm 653, is swung rearwardly thereby rocking shaft 650, and swinging arm 651, but as the outer end of arm 651 is pivoted to front end of rearwardly extending link 652, the swinging movement of arm 651, results in drawing carrier 65, rearwardly to bring the printing element to printing position; during this movement the arms 651, 653, and shaft 650 act as a lever fulcrumed to the front end of link 652, applied to the carrier at 650, and having power applied thereto at the outer end of arm 653, by hook 75. When hook 75 is released from lever 70, spring 654, applied to the carrier and to the free end of link 651, returns the parts and the carrier to normal positions. The arm 651, can oscillate between stops 655, rigid with carrier 65. Other cam, lever or rotary devices mounted on or carried by the carrier 65, can be employed to bring the printing element to and from printing position without shock or hammering.

Each letter is discharged by the printing couple onto the ledge 9, at the front end of the discharge or receiving bed and behind front wall $f$, and the outward movement of the letters on said ledge is limited by stop $f^2$, or by the adjustable stop 10, arranged on and adjustable longitudinally of said wall. The letters are forced rearwardly from the ledge so as to drop down onto the inclined bed $e$, and are properly stacked on said bed by any suitable stacker. For instance, I show a stacker comprising a series of equally spaced spring-pressed swingable letter engaging fingers 90, fulcrumed or pivoted on a horizontal rotary disk 91, arranged in front of wall $f$, and fixed to and driven by vertical shaft 92, mounted in the frame and rotated in the proper direction by gearing 93, 94, from the gear 54, of the main or printing roll shaft 34. (Fig. 1). Each letter engaging arm 90 projects above tangentially from the horizontal head or disk 91, and is rearwardly directed with respect to the direction of rotation of the disk. Each arm is in the form of an elbow or about right angled with its inner laterally extending end extending over the disk and fulcrumed thereto by vertical pin or screw 95, on which the arm swings. Each arm is yieldingly held to its limit of forward movement to its stop pin 96, by its spring 97, so that as the disk revolves each arm will move forwardly through the horizontal slot in wall $f$, and will then sweep across the ledge 9, and toward the outer end thereof and then forwardly through the wall $f$. Each arm can yield as it engages the letters and will not only sweep them from the ledge 9, but will properly stack and press the letters together on the inclined bed $e$.

The spring or yieldingly held stacker fingers move at a greater speed than the letters discharged from the printing couple, for the purpose of pressing back each letter as it enters the discharge way so as to make room for the following letter. In other words, the stacker is designed to clear a path for each letter as it enters the discharge way so that the letters can freely and regularly enter said way and be regularly and properly stacked therein.

I have used the term "letters" herein in a broad sense to include all classes of mail matter or other material or articles which the machine is adapted to handle or imprint.

I have for purposes of illustration and explanation specifically described many formations, arrangements and constructions to which my invention is not limited, and also it is evident that various modifications, constructions and arrangements might be resorted to, that elements might be added, or features omitted without departing from the spirit and scope of my invention, and hence I do not wish to limit myself to the examples illustrated.

What I claim is:—

1. In combination, a printing couple, a reciprocatory feeder to deliver letters thereto, and letter separating devices arranged above and below the path of movement of the feeder and comprising a constantly operating reversely rotated roll, and a movable friction finger intercepting the letter path.

2. A letter separating mechanism comprising a reversely rotating roll and a swinging friction finger traversing the letter path and adapted to bear against the rear face of each letter as fed to the printing couple, said roll and finger being arranged one over the other.

3. A printing couple comprising a constantly rotating letter feeding roll and an opposing member, in combination with a letter separating device, and letter feeding means, said letter separating device comprising a constantly operating reversely rotating roll yieldingly held in frictional driven engagement with said roll of the printing couple.

4. A printing couple comprising a constantly rotating impression roll and an opposing member, in combination with a separating device comprising a reversely rotating roll yieldingly held in frictional driven engagement with the impression roll.

5. A printing couple comprising a yielding surface constantly rotating impression roll and a printing member, in combination with a separating roll yieldingly held across the letter path to said printing couple and in frictional driven engagement with the impression roll.

6. A printing couple comprising a roll constantly driven in letter feeding direction and an opposed member, in combination with a pivotally mounted bracket, a rotary separator roll carried by said bracket in frictional driven engagement with said first mentioned roll, a spring acting on said bracket to yieldingly hold said separator roll across the letter path to said printing couple, and means limiting the swing of said bracket.

7. A separating device comprising a frictional surface reversely rotating roll and means yieldingly holding the same across the letter path to a printing couple whereby said roll can yield for the passage of letters and will bear and reversely rotate against the rear faces of the passing letters.

8. A printing couple comprising a printing roll rotating on a fixed axis, a yielding impression surface, the letter feeding surfaces of said roll and the impression surface being constantly maintained in letter feeding relation, and a printing element rotating with and propelled by the printing roll, said printing element rotated in a path eccentric to the path of rotation of the printing roll and provided with a movable axis, and means for moving said axis for shifting the printing element to and from printing position with respect to the impression surface, said printing element being normally withdrawn from printing position, said means being controlled by the passage of letters to the printing couple to cause the movement of the printing element to printing position.

9. A printing couple comprising constantly rotating feeding surfaces constantly maintained in letter feeding relation, a constantly rotating printing element normally rotating in a path of movement out of printing position, an inking device engaged by the printing element on each rotation thereof and constantly maintained away from inking engagement with said feeding surfaces, and means controlled by the passage of letters to the printing couple for periodically shifting the axis of rotation of the printing element to bring said element up to printing position.

10. A printing roll constantly rotating on a fixed axis, a printing element constantly rotating with and propelled by said printing roll and moving in an eccentric path with respect thereto and having a movable axis, letter actuated means for causing the shifting of said axis to bring said element to printing position, and devices for returning said axis to its normal position during each rotation of said element.

11. A printing roll having its feeding surface maintained in constant feeding position, in combination with a printing element normally withdrawn from printing position and provided with actuating means, and letter operated controlling mechanism for actuating said means by the passing of the letter to the printing roll to cause a printing stroke of the printing element.

12. A printing roll rotating on a fixed axis, in combination with the printing element rotating in an eccentric path with respect to said axis and driven by said roll, said printing element normally moving in a path removed from printing position, a shiftable carrier for said printing element, and letter operated means for causing said carrier to shift on the passage of a letter from the printing roll to bring said element to printing position with respect to said letter.

13. In combination, an impression roll, a printing roll means positively driving said rolls, means constantly maintaining said rolls with their feeding surfaces in letter feeding relation, a printing element propelled by and rotated with the printing roll in the path of movement eccentric to the axis of rotation of the printing roll, a shiftable axis for said printing element, a constantly moving printing element axis shifting member normally operatively disconnected from said axis, and letter actuated means for temporarily establishing operative connection between said axis and said member on the passage of a letter to the printing couple.

14. A constantly rotating printing couple comprising a printing roll and an impression roll yieldingly maintained in constant letter feeding relation, in combination with a finger movably traversing the letter path to said printing couple, a separating device traversing the letter path immediately above said finger, a feeder to successively feed the letters past said finger and separating device to the printing couple, a normally withdrawn printing element moving with said printing roll and shiftable independently thereof, and mechanism controlled by the movement of said finger for causing said element to perform its printing stroke on the passage of each letter to the printing couple.

15. In combination, a printing roll constantly rotating on a fixed axis and having a segmental recess, a printing element driven by and rotating with said roll in a path of movement eccentric to said axis, and arranged in said recess, a movable carrier for said element for shifting the axis of rotation thereof to cause the element to perform a printing stroke, means for moving said carrier from its normal position and for returning said carrier to its normal position on the completion of each printing stroke, and means controlled and operative by the passage of the letters to the printing position for establishing temporary operative connection between said carrier and said means for moving said carrier.

16. In combination, a constantly rotating printing roll and its shaft, said roll having a recess opening through its circumference, a printing element driven by and rotating with the roll in an eccentric path of movement and comprising a bearing sleeve arranged within the roll and a die adapted to be projected from the roll at the printing position, a movable carrier for said roll having an axis on which said sleeve revolves, said carrier being normally arranged to maintain said element from printing position, and mechanism for periodically moving the carrier on the passage of the letters to printing position to cause said element to move to printing relation with respect to said letters.

17. In combination, a printing couple comprising a printing roll, means for positively rotating the same, a printing element driven by and rotating with said roll in an eccentric path of movement with respect thereto with the printing element normally withdrawn from printing position, said element having a shiftable axis whereby the same can be temporarily brought up to printing position, a constantly rotating cam arranged in a fixed relation with respect to said element, a movable element held to and oscillated by said cam, means for establishing operative connection between said axis and said member, said means being normally out of operative relation with respect to said parts, a movable letter actuated element adapted to be moved by each letter as it passes to printing position and provided with means for temporarily shifting said means to establish operative connection between said axis and said movable element.

18. In combination, a constantly rotating impression roll, a constantly rotated printing roll maintained in letter feeding relation with the impression roll, a printing element rotating with the printing roll in an eccentric path of movement with respect thereto and removed from printing position, said element having a shiftable axis whereby the same can be brought up to printing position, means for moving said axis to and from its normal position, said means being normally out of operative relation with respect to said axis, a rock shaft having a finger yieldingly held into the path of movement of letters to the printing position and adapted to be moved thereby, said shaft having means for temporarily establishing operative relation between said axis and said means for moving the same.

19. In combination, a printing roll shaft, a printing roll rotated thereby, a movable carrier, a printing element mounted thereon to rotate in an eccentric path of movement with respect to said shaft and having a printing die adapted when the element is in abnormal position to project beyond the roll to printing position, a cam rotating with said shaft and in timed relation with respect to said die, a movable member held to and oscillated by said cam, a normally disconnected connection between said carrier and said member and provided with means for normally maintaining said connection disconnected, and a movable letter operated element normally projected into the path of the letters to the printing position and having means for temporarily moving said connection into operative connecting position while said element is held out of its normal position by a passing letter.

20. A printing roll constantly rotating on a fixed axis and having a recessed portion opening through its periphery, in combination with a printing element propelled by and rotating with said roll in an eccentric path with respect to said axis and normally maintained in printing position and provided with letter controlled operating means for causing the same to perform its printing stroke.

21. In a mail marking machine, in combination, a printing couple, means for feeding letters thereto, a letter actuated member normally projected yieldingly into the letter path to said couple and adapted to be operatively moved by each letter passed to the printing couple, said couple comprising rotatory impression and printing members maintained in operative relation and a normally withdrawn printing element rotating with said printing member, and mechanism controlled by said letter actuated member for temporarily bringing said printing element to printing position.

22. In a mail marking machine, in combination, an impression surface, an opposing member constantly rotating about a fixed axis, a printing element rotating therewith and normally withdrawn from printing position and movable to and from printing position independently thereof, constantly driven means for moving said element to printing position and normally operatively disconnected therefrom, and mechanism actuated by the passage of each letter to printing position for temporarily establishing operative connection between said element and said constantly driven means.

23. In a mail marking machine, in combination, an impression surface, a constantly rotating member opposing the same, a printing element rotating therewith and movable independently thereof to and from printing position, means normally maintaining said element in inoperative position, and mechanisms for temporarily projecting said element to operative printing position on the passage of each letter to the printing position, said mechanisms comprising letter actuated means.

24. In a mail marking machine, in combination, an impression surface, a rotary member opposing the same, a printing element rotating with said member and normally withdrawn from printing position and having an independent movement to and from printing position, a constantly driven actuating member, normally disconnected operative connections therefrom to said element to force the same to printing position, and a yieldingly-held letter-moved member adapted to be operatively moved by each letter passing to the printing position and provided with means for temporarily connecting said actuating member and said normally disconnected operative connections.

25. In a mail marking machine, in combination, an impression surface, a rotatory printing element, a spring device normally holding said element from printing relation with respect to said surface, operative connections for moving said element to printing position, a constantly acting driving member, and a letter-actuated device for temporarily establishing operative connection between said driving member and said connections for forcing said printing element to printing position on the passage of a letter to printing position.

26. In a mail marking machine, in combination, an impression surface at the printing position, a printing element normally held from printing relation with respect to said surface, a letter-actuated finger yieldingly held in the path of the letters moving to printing position, a constantly moving driving member, a movable connection adapted to engage and be operatively moved by said member and yieldingly held from operative engagement therewith, said finger provided with means for forcing said connection into operative engagement with said member, and mechanism actuated by said connection for forcing said printing element to printing position.

27. In a mail marking machine, in combination, an impression surface at the printing position, a rotating printing element normally held from printing relation with respect to said surface, devices to force said element to printing position comprising a constantly operating driving member and operative connections therefrom to said element provided with a movable link normally and yieldingly maintained from operative connection with said driving member, and a letter-actuated device yieldingly held in the letter path to the printing position and adapted to be operatively moved by each letter passing to the printing position and provided with means comprising a yielding contact to force said link into operative engagement with said driving member.

28. In a mail marking machine, in combination, an impression surface at the printing position, a rotatory printing element normally withdrawn from printing relation with respect to said surface, a constantly rotating cam timed with respect to said element and the printing position, a member moved by and in constant operative relation to said cam, and operative connections between said member and said printing element for forcing said element to printing position comprising means whereby said connections are normally maintained disconnected, and letter actuated means for establishing said connections.

29. In a mail marking machine, in combination, an impression surface, a printing element normally maintained from printing relation with respect to said surface, normally inoperative means for forcing said element to printing position, a letter feeder for moving letters to printing position, and a letter actuated device for controlling said normally inoperative means to bring said element to printing position on the passage of a letter to said position, said device comprising a movable finger in the letter path and constituting a separating finger.

30. In combination, an impression surface, means for successively presenting letters thereto for imprinting, a rotating member opposite said surface, a printing element rotating with said member and normally maintained from printing relation with respect to said surface and having an independent range of movement to and from printing position, letter-actuated means for causing the movement of said element to printing position, and devices for returning said element to its normal inoperative position during each rotation of said member.

31. In combination, in a mail marking machine, a constantly rotating impression roll, a rotatory printing member, a reciprocatory feeder for successively presenting letters to said roll, and a reversely and constantly rotating separating roll arranged adjacent to and actuated by said impression roll and yieldingly and normally projected into the path of the letters to said roll.

In testimony whereof I affix my signature, in presence of two witnesses.

WILLIAM BARRY.

Witnesses:
P. H. MOORE,
C. R. WRIGHT, Jr.